(12) United States Patent
Zanuccoli et al.

(10) Patent No.: US 6,359,500 B1
(45) Date of Patent: Mar. 19, 2002

(54) CHARGE PUMP WITH EFFICIENT SWITCHING TECHNIQUES

(75) Inventors: Mauro Zanuccoli, Cesenatico; Roberto Canegallo, Tortona; Davide Dozza, Villanova, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/735,277

(22) Filed: Dec. 11, 2000

(51) Int. Cl.⁷ .................................................. G05F 1/10
(52) U.S. Cl. ............................................. 327/536
(58) Field of Search ................................. 327/530, 534, 327/535, 536, 537

(56) References Cited

U.S. PATENT DOCUMENTS

| | | | |
|---|---|---|---|
| 6,075,402 A | * | 6/2000 | Ghilardelli et al. ......... 327/536 |
| 6,198,342 B1 | * | 3/2001 | Kawai ........................ 327/534 |
| 6,268,762 B1 | * | 7/2001 | Nguyen ...................... 327/536 |

\* cited by examiner

*Primary Examiner*—Jeffrey Zweizig
(74) *Attorney, Agent, or Firm*—Lisa K. Jorgenson; Robert Iannucci; Seed IP Law Group PLLC

(57) ABSTRACT

Presented is an energy efficient charge pump, that includes at least two stages. Each stage has input and output nodes, which correspond to terminals of a first transistor. A boost capacitor is tied to the input node, and a second capacitor is tied to an internal node, which is also the gate terminal of the first transistor. A second transistor is located between the input node and the internal node, and has a gate coupled to the output node. A driving signal generator generates ramped voltage driving signals and non-ramped voltage driving signals. Attached to the driving signal generator is a phase driver that applies the ramped voltage driving signals to the boost capacitor and applies the non-ramped voltage driving signals to the second capacitor. Also presented also is method of driving a charge pump, such as the one described above, where the boost capacitor is driven with a ramped voltage signal, while the second capacitor is driven with a non-ramped voltage signal.

24 Claims, 9 Drawing Sheets

CHARGE PUMP WITH EFFICIENT SWITCHING TECHNIQUES

TECHNICAL FIELD

This invention relates to the field of charge pumps in semiconductor electrical devices, and, more specifically, to methods of driving new and existing charge pumps in such a way as to increase their overall efficiency.

BACKGROUND OF THE INVENTION

Non-volatile memories (NVMs) that are only supplied with a single voltage (Vdd) generally include both positive and negative voltage boost circuits in order to produce necessary on-chip voltages that are different from the Vdd supply. NVMs require high voltages to program and delete information stored in the individual memory cells.

The contribution to the total power dissipation of the chip of these voltage boost circuits is usually high, sometimes up to 30% of the total power dissipated by the chip. Additionally, such components of the system are further characterized by very low yields, typically around 30%. The problem is particularly relevant to the application fields of NVMs—and, more in general, to the chips having internal DC/DC up converters (charge pumps) in which the power at disposal of the system supply is limited and expensive.

Important examples include portable devices such as cellular phones, palmtops, notebooks, smart cards, movable equipment, communication apparatuses, biomedical apparatuses, digital cameras, MP3 players, etc. Such applications generally require a battery, presenting cost, duration, weight and dimension issues that can be made less onerous by particularly modifying the power requirements of the system they have to supply.

Such applications also generally utilize NVMs, particularly FLASH memories, and power converters. Thus, one way to reduce power consumption in these devices is to reduce the power used by charge pumps, which are some of the main agents responsible for the power dissipation in these low-power systems.

The prior art includes charge pumps, or voltage boosters, that are formed in CMOS technology and include both P and N type transistors. A booster is formed by a series of (n) stages, each including a high value boosting capacity (typically a capacitor) and a switch that allows a current to flow. In the case of positive charge pumps, the current flows from the Vdd supply to the output node. An example of such a positive boost circuit is shown in FIG. 1.

In positive charge pumps, the number of separate stages (n) is a function of the Vdd supply voltage and the desired output voltage. Particularly, the asymptotic value of the output voltage is given by $V_{out}=(n+1)V_{dd}$.

In general, as shown in FIG. 2, a typical charge pump 5 receives a voltage signal Vin, and, through the driving signals A, B, C and D, produces an output voltage signal Vout, which is coupled to an output capacitance. The driving signals are provided by a phase driver 8.

One of the best present architectures from the efficiency and performance standpoint is the one in which the k-nth elementary stage is a circuit as that shown in FIG. 3. In that Figure, a multi-stage circuit 10 includes an NMOS transistor type switch 20 coupling an end-stage node 28 to an inter-stage node 25. Another NMOS transistor switch gate 24 used for separating two adjacent stages is also shown. Boost capacitances 22 are comparable with the load capacitance Cload of FIG. 2.

A respective timing diagram showing operation of the circuit shown in FIG. 2 is indicated in FIG. 4. In FIG. 4 the signals associated with the labels A, B, C, and D denote voltage signals applied to the respective nodes in FIG. 2. Note that node A is not shown in FIG. 3, but would reside before node B, and be structured like the node C. The signals B and D are boost phases and phases A and C are used to boost the switch 24 at high voltage.

When B goes HIGH at a time T0, the transistor 20 is ON and a node 25 charges toward potential of the node 28 through the transistor 20. Once charged, the node 25 stays isolated since D goes LOW shortly (Dt time after T0) after B goes HIGH, thus turning off the transistor 20. Driving the node C causes a mini-boost effect on the transistor 24, through a driving capacitor 26. The driving capacitor 26 generally has a capacitance value of about one order lower than that of the boost capacitors 22. In this way, the NMOS conductivity of transistor 24 stays high, and since the transistor 20 turns OFF only when D goes low, the charge packet transfer from one stage to another occurs only in the direction toward an output node at the last stage (not shown in FIG. 3), and not vice-versa. As seen in FIG. 4, when D goes HIGH, also C switches LOW, turning OFF the transistor 24 in FIG. 3. This process is repeated for the number of stages downstream toward the output node. At each process, the transistor switches 20, 24 alternatively open and close. If the transistor switches 24 having even number k's are open, then the even numbered transistors 20 will be closed and vice versa, depending on the timing of the phases.

A known realization 30 in the art of boost drivers for the charge pumps is shown in FIG. 5. Boost drivers are widely used and are the main dissipation sources inside a charge pump. In this Figure, the boost drivers include triple-state buffers 32 and 34. In the operation of this circuit 30, the switching of the boost phases B and D (FIG. 4) is preceded by an equalization operation between output nodes of the drivers 32, 34, implemented by turning on an equalizing transistor 36. In doing so, charge sharing occurs between nodes F and G, respectively located at the output nodes of the drivers 32, 34, while the drivers 32, 34 present a high impedance level. Without regarding parasitic capacitances, the nodes F and G obtain a midpoint at a voltage about Vdd/2. At the end of the charge sharing operation, the two drivers 32, 34, lose their high impedance level and switch.

This charge sharing function allows an energy sharing at a driver level theoretically equal to 50%, but actually it is limited to the unavoidable change of the timing pulses. The physical implementation of the wave forms shown in FIG. 4 will not be exactly as shown in that Figure, but rather will have imperfections. In fact, if the nodes F and G simultaneously switch because of the equalization through the transistor 36, and supposing that B has to go HIGH and D LOW, the transistor switch 20 switches OFF prematurely. This premature shutoff prevents the node 25 from reaching the optimal voltage value to be able to easily drive the transistor 24.

Another problem exists when driving charge pumps, such as the charge pump shown in FIG. 3. In operation, the transistors of the charge pump are affected by the well known Body effect, due to the large potential difference between the switch well and the source junction. This effect is particularly pronounced in stages that are close to the output. When this effect is pronounced, the threshold voltages increase too much and the transistor conductivity is "penalized" because it depends on the decrease of the voltage Vgs–Vt. Furthermore, the drain and source roles change during the actual boost phases, and this involves great difficulties to reduce the body effect. Also, the lessened conductivity involves the lowered threshold of the transistor and changes the output voltage from its normal asymptotic shape. Such limited conductivity further causes increased energy dissipation of the switch.

The problem of the body effect has been effectively solved by using NMOS transistors in a voltage divider and formed in a triple well implementation, as shown in FIG. 6. In that Figure a circuit 40 is supplied by a pump output 42, which is able to produce bias voltages of the wells for each stage, with the aim to reduce the potential difference between well and source and with the care of not having the well—drain and well—source junctions in direct conductivity.

Other solutions to reduce power dissipated by the charge pumps can, in general, intervene at a system level, particularly in NVMs. The solutions used in the booster field typically involve an increase in the complexity of the cells in the cell array. These solutions typically cause a remarkable increase in the array area, and are therefore not preferred.

The prior art thus fails to adequately reduce the energy losses sustained when using a charge pump without adversely modifying its architecture.

SUMMARY OF THE INVENTION

Embodiments of the invention operate at the driver level of charge pumps without modifying their architecture, and decrease the energy dissipated by the drivers. Efficient switching techniques are used to precisely control the drivers that in turn supply the charge pumps.

Presented is charge pump, that includes at least two stages. Both stages include an input node and an output node, located at the terminals of a first transistor. A first capacitor is coupled between the input node and a first driving node, and a second capacitor is coupled between a second driving node and an internal node, which is also the gate terminal of the first transistor. A second transistor is coupled between the input node and the internal node, and has a gate coupled to the output node. Coupled to the stages is a driving signal generator that generates ramped voltage driving signals and non-ramped voltage driving signals. Coupled to the driving signal generator is a phase driver that applies the ramped voltage driving signals to the first capacitor of the first and second stages, and applies the non-ramped voltage driving signals to the second capacitor of the first and second stages.

Presented also is method of driving a charge pump, such as the one described above, where the first, or boost capacitor of the first stage is driven with a ramped voltage signal, while the second, or driving capacitor of the first stage is driven with a non-ramped voltage signal.

BRIEF DESCRIPTION OF THE DRAWINGS

FIG. 7b is another schematic diagram of the generic driver circuit of FIG. 7a.

DETAILED DESCRIPTION OF THE INVENTION

Figure 7A:
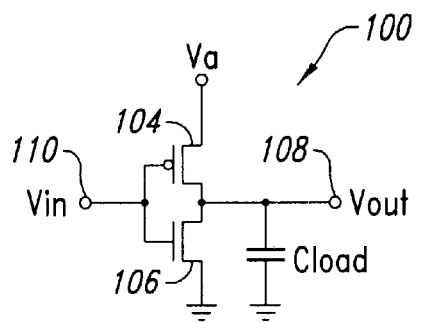
FIG. 7a is a schematic diagram of a generic driver circuit.
Figure 7B:
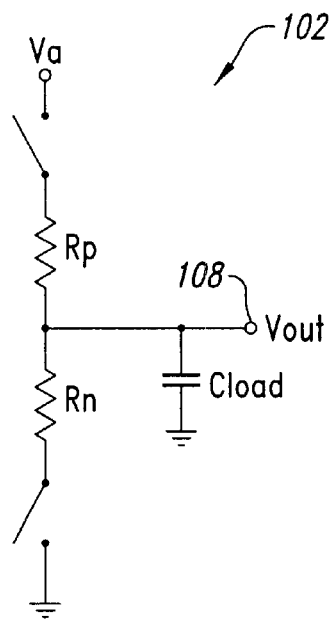

With reference to FIGS. 7a and 7b, a generic driver 100 and a respective schematic diagram 102 in terms of equivalent resistances associated to two transistor switches 104, 106 in the driver 100 are shown. This diagram also represents charge pump drivers, if the capacitance $C_{load}$ is substituted by the total capacity towards ground seen by boost drivers themselves. If the parasite capacities are neglected and if the boost capacitances are considered equal (C(k)=C for each k), the charge capacitance in question is equal to C/2. Thus, an output node $V_{out}$ 108 corresponds to a lower plate of a generic boost capacitance.

Consider a changing of an output voltage at the output node 108 from LOW to HIGH, i.e., closing the transistor switch 104 and opening the transistor switch 104. A current $I(\theta)$ to charge the capacitor $C_{load}$ (C) is the same as that which passes through a resistor $R_P$. To cause the output node 108 to change from LOW to HIGH, the signal at an input node, Vin 110, must change from HIGH to LOW. In this scenario, assume $V_A(t)$ indicates the supply voltage at time t, and in order to simplify the explanation, $R_P$=R. As for time, t=0 defines the start of the charging of capacitor $C_{load}$ and t=T defines the end. Further, Vc(t) represents the output voltage at the output node 108. This scenario can be described by the equation $$Vc(t) = \frac{1}{C}\int_0^t I(\theta)d\theta = \frac{1}{C}\overline{I(\theta)}t \qquad 1$$

When $I(\theta)$ represents the average current in the interval [0 . . . t], the result becomes:

$$\overline{I(\theta)}t = \frac{Vc(t)C}{T} \qquad 2$$

Thus, the dissipated energy at a driver level (in this case on R), which charges C, becomes $$E_{diss}^R = \int_0^T I(\theta)V_R(\theta)d\theta \qquad 3$$
$$= R\int_0^T I^2(\theta)d\theta$$

-continued $$\geq R \int_0^T \overline{I^2}(\theta) d\theta$$

$$= \left(\frac{RC}{T}\right) CV_{dd}^2$$

Defining $V_R(t)=V_A(t)-V_C(t)$ the drop on R, and supposing $V_C(t)=V_{dd}$, the equality is valid if the charge current is constant, so that $\overline{I(T)}=I(t)$ for each value of t.

To the contrary, in the conventional case of charging one capacitor $V_A(t)=V_{dd}$ the charge current is not constant and, thus, in equation 3, only the inequality is valid. Particularly, in the case of conventional charging:

$$E_{diss}^R = \tfrac{1}{2} CV_{dd}^2 \qquad 4$$

As is seen from this equation, half of the supplied energy is stored on the load, while the remaining energy is dissipated on R, or into the driver in irreversible mode. The case that minimizes, with an equal energy given to the load $E^C$, the dissipated energy on the driver $E^R$ is the one where C is charged at constant current. The conventional case is to charge the load with a constant supply voltage, which corresponds to charging C with an exponential current.

In embodiments of the invention, however, a supply voltage with a ramp from 0 to $V_{dd}$ charges the load C with a constant current. In this case, the following equation is valid:

$$E_{diss}^R = \left(\frac{RC}{T}\right) CV_{dd}^2 \qquad 5$$

When charge time, or ramp duration increases, the dissipated energy for charging the load decreases, approaching 0 at the limit case. Therefore, the compromise in dissipated energy is between energy and time. Obviously T (total time) has to be much greater than the RC charge time constant of the capacitor with the value C.

Figure 4:
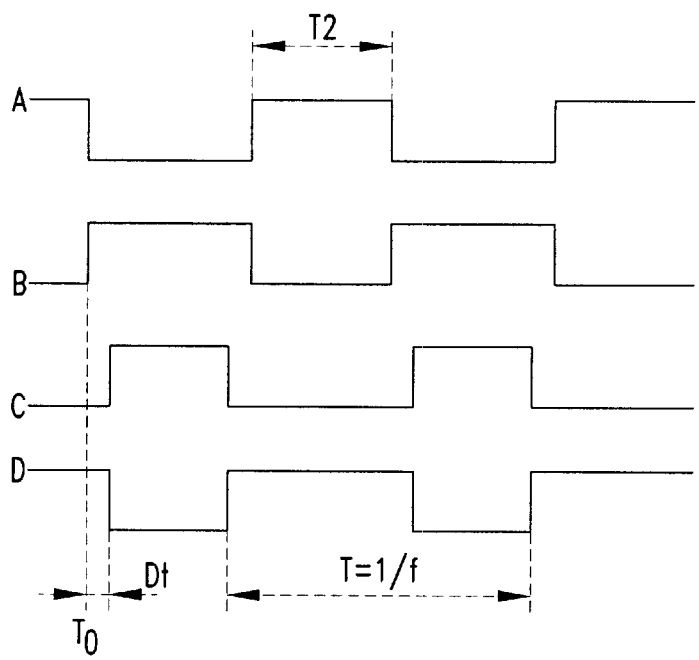
FIG. 4 is a timing diagram showing signals used to drive the stages shown in FIG. 3.
Figure 5:
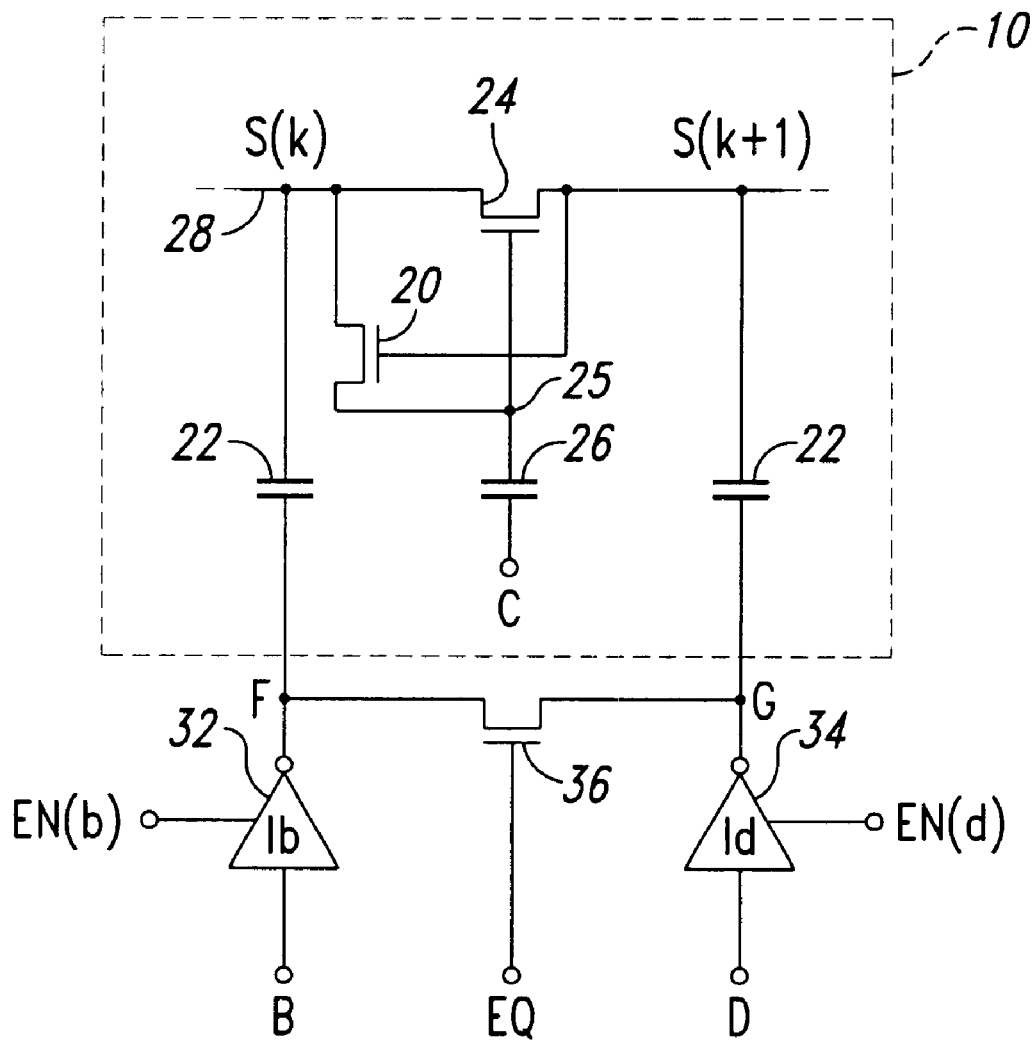
FIG. 5 is a schematic diagram showing the charge pump circuit of FIG. 3 with a boosting driver stage.
Figure 8:
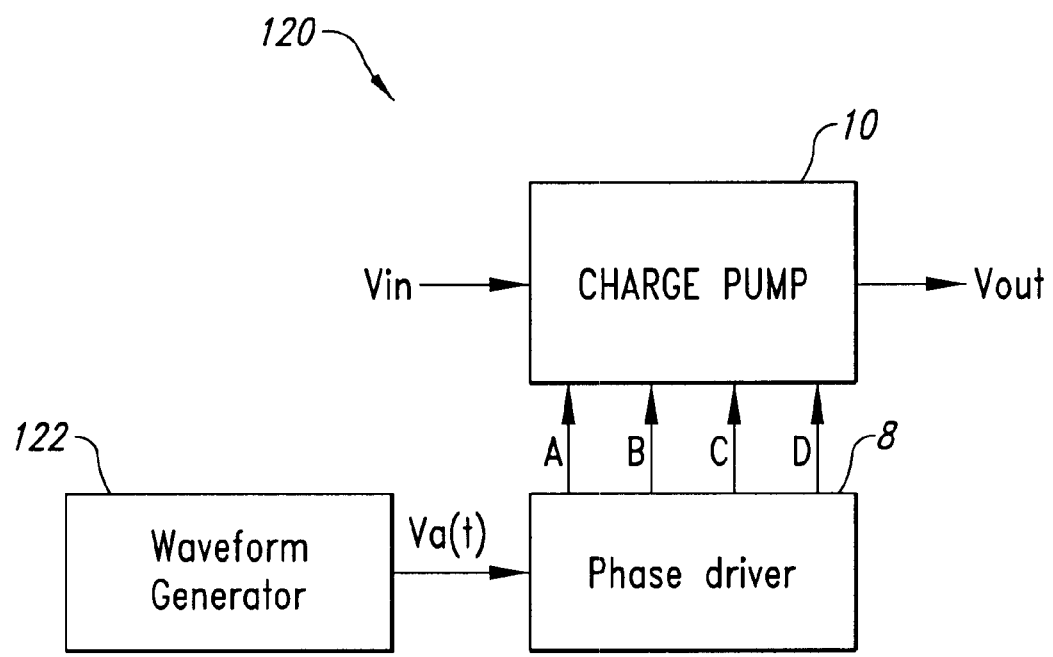
FIG. 8 is a block diagram of a charge pump driving circuit according to an embodiment of the invention.

By changing the way the charge pumps are driven, it is therefore possible to decrease the total energy dissipated on the pump drivers. A block diagram showing an embodiment of an inventive charge pump driving circuit 120 is shown in FIG. 8. This diagram differs from the block diagram of FIG. 4 in that it includes a ramp supply or waveform generator 122, in addition to the phase driver 8 and the charge pump 10 itself.

Figure 6:
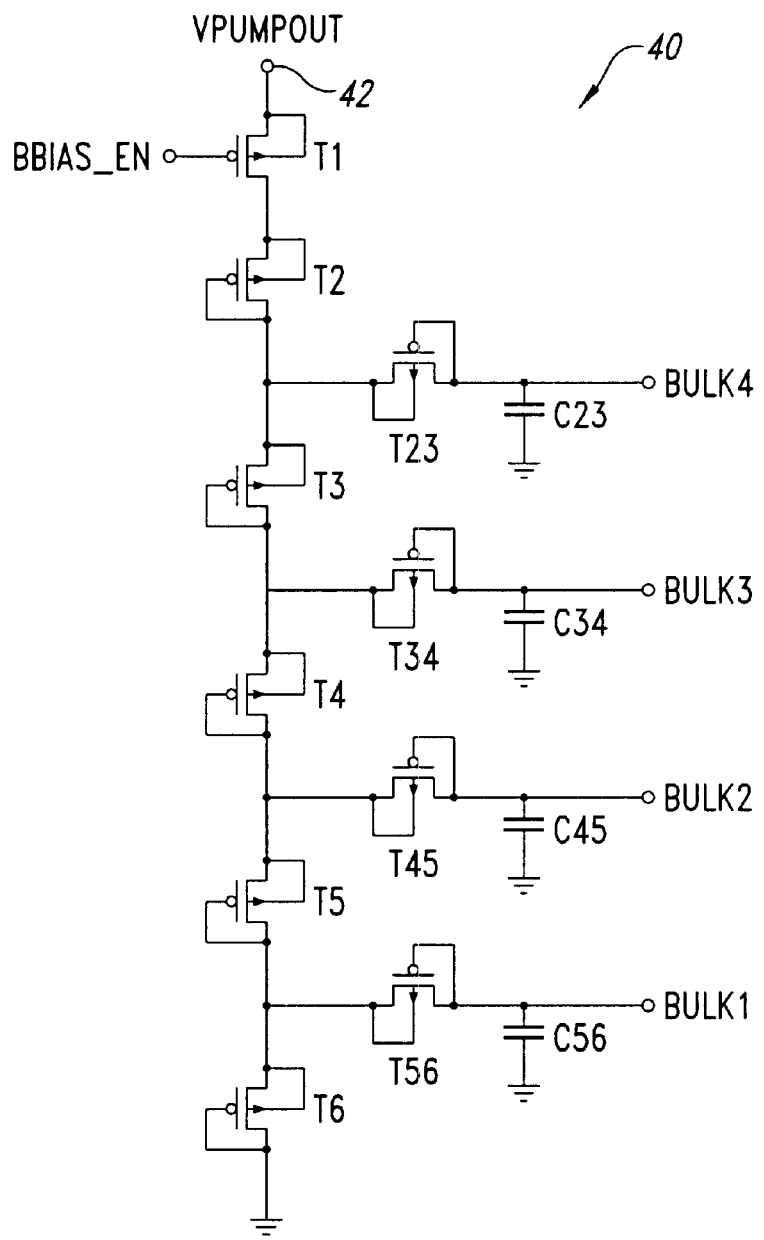
FIG. 6 is a schematic diagram of a voltage divider that can be fabricated in triple well technology according to the prior art.
Figure 9:
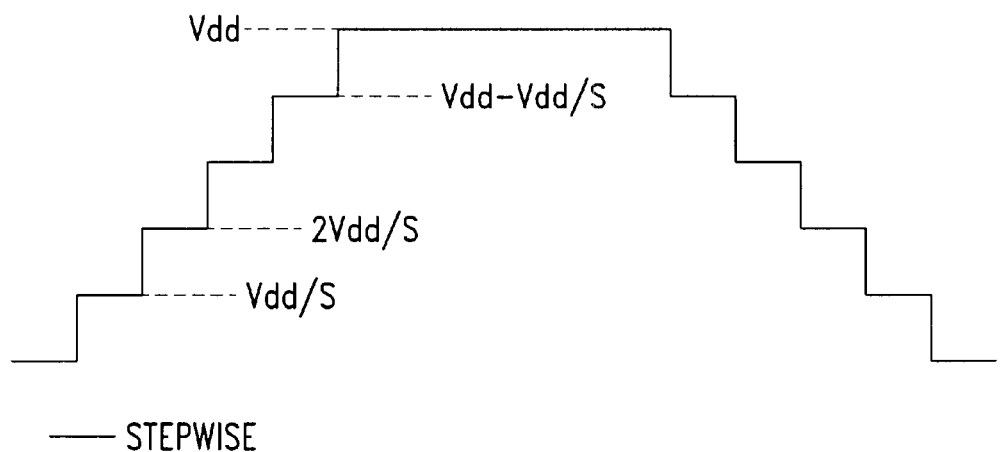
FIG. 9 is a graph showing a sample output waveform produced by a waveform generator according to an embodiment of the invention.

To generate a voltage ramp, it is possible to use an integrator circuit such as an integrator amplifier, or, approximating the voltage ramp with a series of stepped voltages. An example of a stepped approximation is shown in FIG. 9. By increasing of a number (s) of steps in the simulated voltage ramp, the dissipated energy on the drivers, such as the drivers 32, 34 of FIG. 6, decreases by a factor of s. Other methods exist to generate steps for this stepwise charging of the load capacitors.

Figure 10:
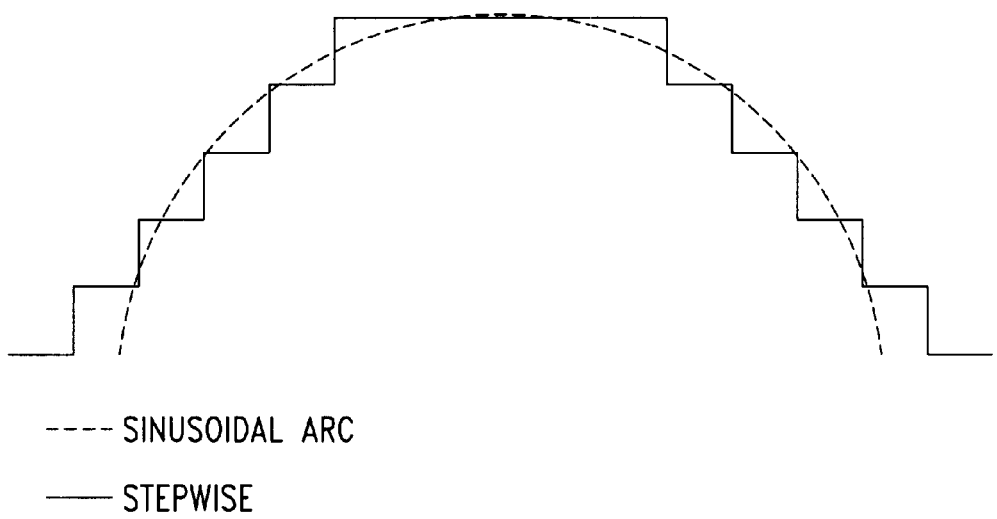
FIG. 10 is a graph showing another sample output waveform produced by a waveform generator according to an embodiment of the invention.

Additionally, the steps or ramps of FIG. 9 could be substituted by a sinusoidal wave form, such as the one shown in FIG. 10. In such a case the supply generator could easily be embodied by an oscillator circuit.

Figure 1:
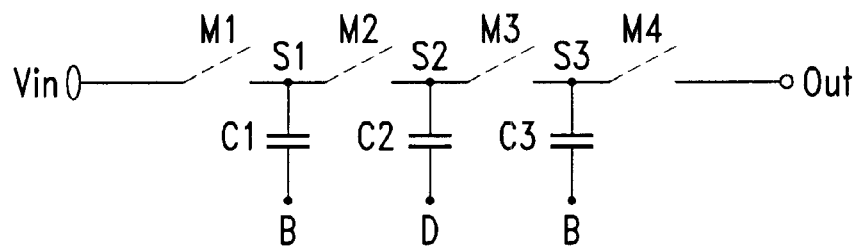
FIG. 1 is an example of a voltage boosting circuit according to the prior art.
Figure 2:
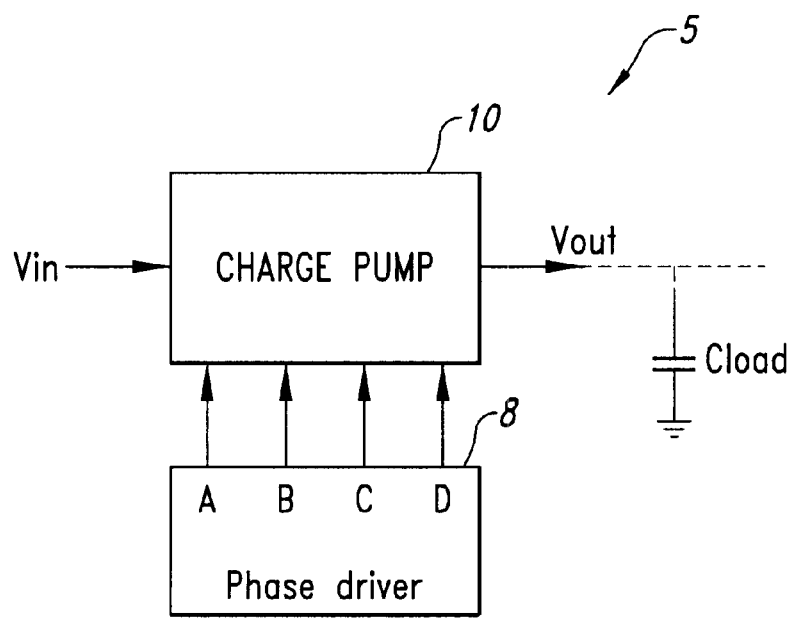
FIG. 2 is a block diagram of a charge pump according to the prior art.
Figure 3:
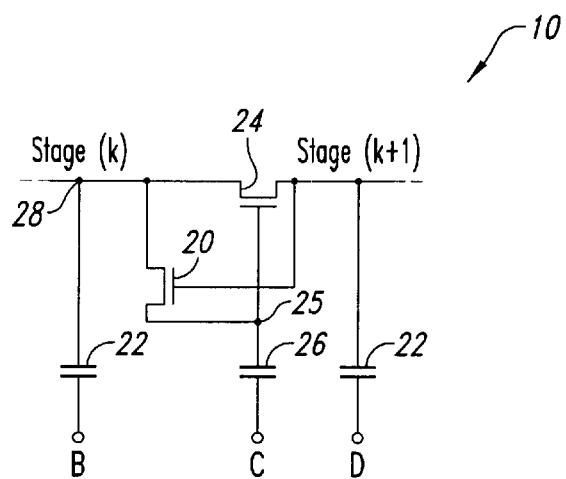
FIG. 3 is a schematic diagram of stages of a charge pump circuit according to the prior art.
Figure 11:
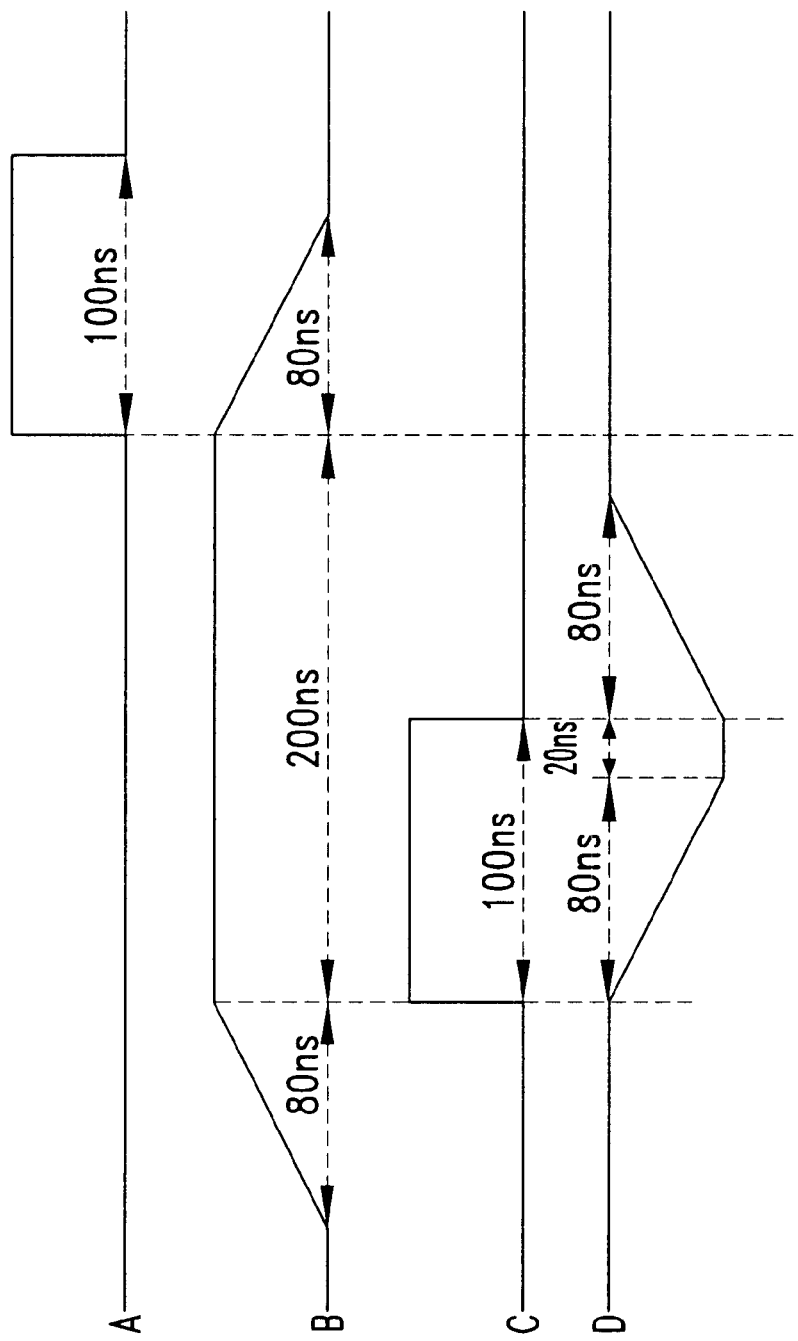
FIG. 11 is timing diagram showing sample waveforms produced by a phase driver according to an embodiment of the invention.

This technique of driving load capacitors with a non-constant supply voltage can be utilized with virtually all the booster architectures already existing, and in the particular case of the architecture shown in FIG. 2, the wave forms for the phases are preferably substituted by the ones shown in FIG. 11. In that Figure, the selected period is equal to 360 ns, and one fall period is shown. In a particularly advantageous embodiment, voltage ramps on the B and D nodes have an 80 ns rise and fall time. The ramps are applied to the boost phases B and D only, since these phases control the switch 20 (FIG. 2) and are associated with the lowest power dissipation effects. The nodes A and C are driven conventionally.

Figure 12:
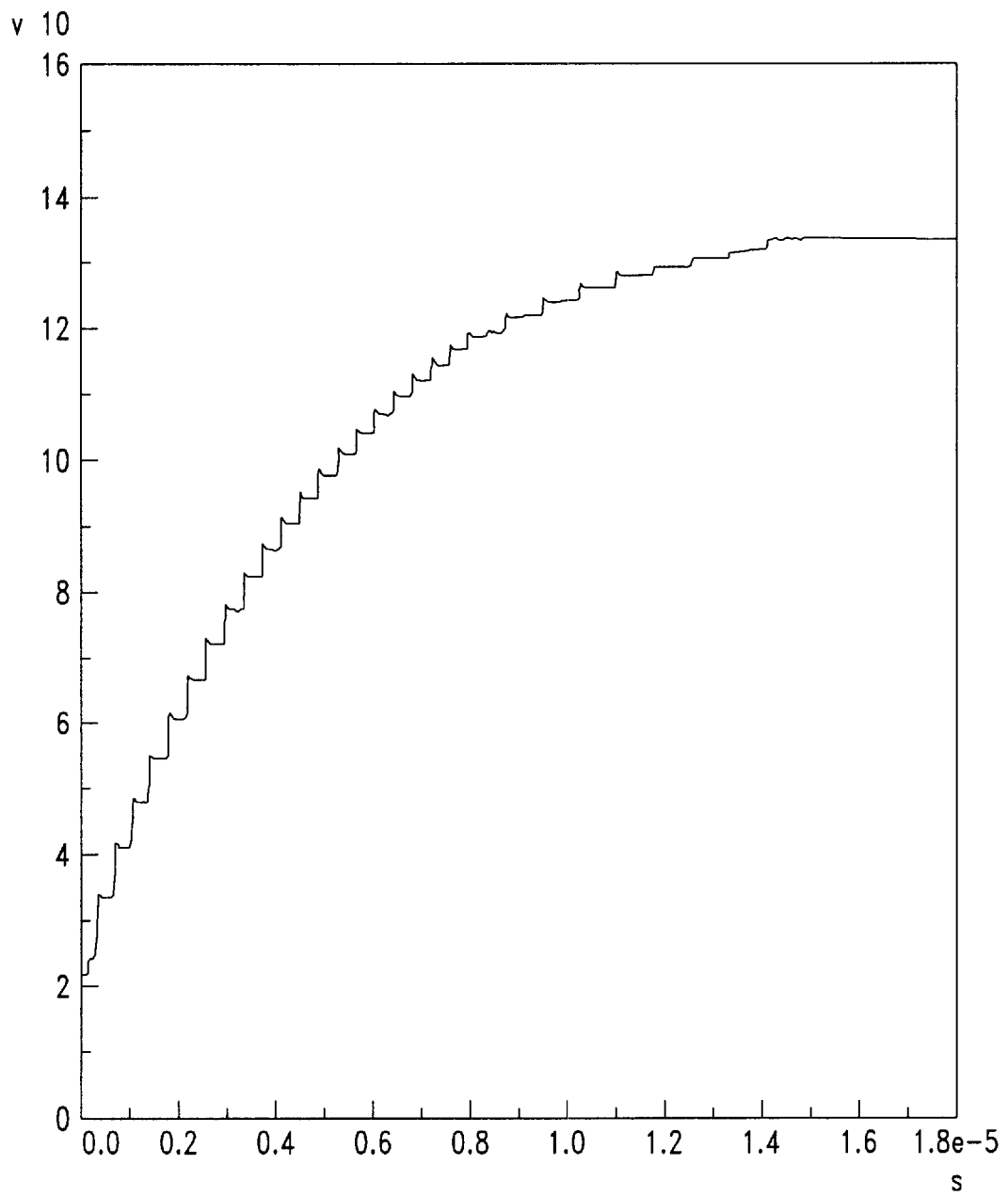
FIG. 12 is a graph showing a simulated output of a charge pump according to an embodiment of the invention.

As an example of the energy savings possible with the inventive method, if the non-constant driving technique is applied to a 4 stage pump with a supply voltage of 3.3V and output voltage of 13V, it is possible to increase the yield of the pump from 38.9% to 61% by using equal phase periods. An example of a simulated output voltage from such a pump is shown in FIG. 12.

By taking more time than is necessary to adequately drive the charge pumps, a large savings of energy can be realized. With this trade off between timing performance and energy, it is possible to save significant amounts of energy otherwise wasted, as shown by the charge pump yield increase equations listed above. In most instances, the trade-off with timing performances would not be excessively penalizing because the charge pumps are generally used during the programming of the NVMs, which are generally slow in any case by other factors. For example, the programming of NVMs typically requires a duration of at least 10 µs.

Therefore, using this method of driving charge pumps with varying voltages can easily increase the charge pump yield, with a minimum energy-time trade-off. No changes need be made to the existing charge pump architectures themselves, although small, easily made changes will be necessary in the driving circuitry. Thus, this new solution can be applied to virtually any charge pump present in art. Another benefit is that there is no additional circuitry added at the array matrix level, thus, no additional circuitry is required in that portion of a circuit. This saves area and complexity.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

We claim:

1. A method of driving a charge pump having plural stages, each stage including a stage input node coupled through a boost capacitor to a first node, a first transistor coupled between the stage input node and an internal node and having a gate coupled to a stage output node, a second transistor coupled between the stage input node and the stage output node and having a gate coupled to the internal node, and a driving capacitor coupled between a second node and the internal node, the method including:
   in a period,
      driving the boost capacitor of at least one stage with a ramped voltage applied to the first node of the at least one stage; and
      driving the driving capacitor of the at least one stage with a non-ramped voltage applied to the second node of the at least one stage.

2. The method of claim 1 wherein the boost capacitor is charged at a substantially constant current by the ramped voltage.

3. The method of claim 1 wherein the driving capacitor is charged by a substantially constant voltage.

4. The method of claim 1 wherein a charging time of the boost capacitor is greater than an RC charge time constant of the boost capacitor.

5. The method of claim 1 wherein driving the boost capacitor comprises driving a boost driver coupled to the boost capacitor.

6. The method of claim 1 wherein the plural stages include a first and a second stage, and wherein driving the boost capacitor with a ramped voltage comprises:

at the first node of the first stage, increasing the ramped voltage from a first voltage level to a second voltage level over a first time period, maintaining the second voltage level for a second time period, and decreasing the ramped voltage from the second voltage level to the first voltage level over a third time period; and at the first node of the second stage, at an end of the first time period, decreasing the ramped voltage from the first voltage level to a third voltage level over a fourth time period, maintaining the third voltage level for a fifth time period, and increasing the ramped voltage from the second voltage level to the first voltage level over a sixth time period.

7. The method of claim 6 wherein the wherein the period is approximately 360 nanoseconds and wherein the first, third, fourth and sixth time periods are between approximately 60 and 100 nanoseconds.

8. The method of claim 6 wherein the period is approximately 360 nanoseconds and wherein the second time period is approximately between 180 and 220 nanoseconds.

9. The method of claim 6 wherein the period is approximately 360 nanoseconds and wherein the fifth time period is approximately between 5 and 35 nanoseconds.

10. The method of claim 6 wherein the first, second, third, fourth, fifth, and sixth time periods take place within the period.

11. A method of driving a charge pump having a first and a second stage, serially coupled, each stage including a stage input node coupled through a boost capacitor to a first node, a first transistor coupled between the stage input node and an internal node and having a gate coupled to a stage output node, a second transistor coupled between the stage input node and the stage output node and having a gate coupled to the internal node, and a driving capacitor coupled between a second node and the internal node, the method including:

providing a base voltage to the stage input node of the first stage;

driving the driving capacitor of the first stage with a first non-ramped voltage signal applied to the second node of the first stage;

driving the boost capacitor of the first stage with a first ramped voltage signal applied to the first node of the first stage;

driving the driving capacitor of the second stage with a second non-ramped voltage signal applied to the second node of the second stage; and driving the boost capacitor of the second stage with a second ramped voltage signal applied to the first node of the second stage.

12. The method of claim 11 wherein driving the boost capacitor of the first stage comprises applying a negative voltage signal to the boost capacitor.

13. The method of claim 11 wherein driving the boost capacitor of the first stage with a ramped voltage comprises:

at the first node of the first stage, increasing the ramped voltage from a first voltage level to a second voltage level over a first time period, maintaining the second voltage level for a second time period, and decreasing the ramped voltage from the second voltage level to the first voltage level over a third time period.

14. The method of claim 13 wherein driving the boost capacitor of the second stage with a ramped voltage comprises:

at the first node of the second stage, at the end of the first time period, decreasing the ramped voltage from the first voltage level to a third voltage level over a fourth time period, maintaining the third voltage level for a fifth time period, and increasing the ramped voltage from the second voltage level to the first voltage level over a sixth time period.

15. The method of claim 14 wherein the fourth time period is approximately between 60 and 100 nanoseconds, the fifth time period is approximately between 5 and 35 nanoseconds, and the sixth time period is approximately between 60 and 100 nanoseconds.

16. The method of claim 13 wherein the first time period is approximately between 60 and 100 nanoseconds, the second time period is approximately between 180 and 220 nanoseconds, and the third time period is approximately between 60 and 100 nanoseconds.

17. The method of claim 11 wherein the boost capacitor of the first stage is charged at a substantially constant current by the first ramped voltage signal.

18. The method of claim 11 wherein a charging time of the boost capacitor of the first stage is greater than an RC charge time constant of the boost capacitor of the first stage.

19. The method of claim 11 wherein driving the boost capacitor of the first stage comprises driving a boost driver coupled to the boost capacitor of the first stage.

20. A charge pump, comprising:

a first and a second stage, each stage including
an input node at a first terminal of a first transistor and an output node at a second terminal of the first transistor,
a first capacitor coupled between the input node and a first driving node,
a second capacitor coupled between a second driving node and an internal node at a gate terminal of the first transistor, and
a second transistor coupled between the input node and the internal node, and having a gate coupled to the output node;

a driving signal generator structured to generate ramped voltage driving signals and non-ramped voltage driving signals; and a phase driver coupled to the driving signal generator and to the charge pump, the phase driver structured to accept the ramped voltage driving signals and apply them to the first driving node of the first and second stages, and structured to accept the non-ramped voltage driving signals and apply them to the second driving node of the first and second stages.

21. The charge pump of claim 20 further comprising a first and a second boost driver coupled to the first driving node of the first and second stage, and wherein the phase driver applies the ramped voltage driving signals to the first and second boost driver.

22. The charge pump of claim 20 wherein the driving signal generator generates a series of stepped voltages to produce the ramped voltage driving signals.

23. The charge pump of claim 20 wherein the driving signal generator generates a substantially sinusoidal wave form to produce the ramped voltage driving signals.

24. The charge pump of claim 23 wherein the driving signal generator comprises an oscillator circuit.

* * * * *